219-121

SEARCH ROOM

Dec. 23, 1969 C. CHIOU ET AL 3,485,996

LASER WELDING

Filed Jan. 11, 1967

INVENTOR
JAMES F. SMITH
CHARLES CHIOU
SYDNEY S. HUANG

BY Robert W. Ely
ATTORNEY

United States Patent Office 3,485,996
Patented Dec. 23, 1969

3,485,996

LASER WELDING

Charles Chiou, Wappingers Falls, and James F. Smith and Sydney S. Huang, Poughkeepsie, N.Y., assignors to International Business Machines Corporation, Armonk, N.Y., a corporation of New York Filed Jan. 11, 1967, Ser. No. 608,657
Int. Cl. B23k *27/00*
U.S. Cl. 219—121 5 Claims

ABSTRACT OF THE DISCLOSURE

A laser welding method for electrically connecting an integrated chip to a substrate utilizes reflected light to trigger a laser beam which is deflected. A chip lead extends over the adjacent land of the substrate. When a light sensitive oscillator senses the brightness of the light reflected from the chip lead vertically through an inclined mirror, a laser is triggered and its beam is reflected from the mirror so that the chip leads are bonded to the substrate lands when the chip leads are positioned under the inclined mirror which also serves to reflect the triggered laser beam.

Figures 1, 2:
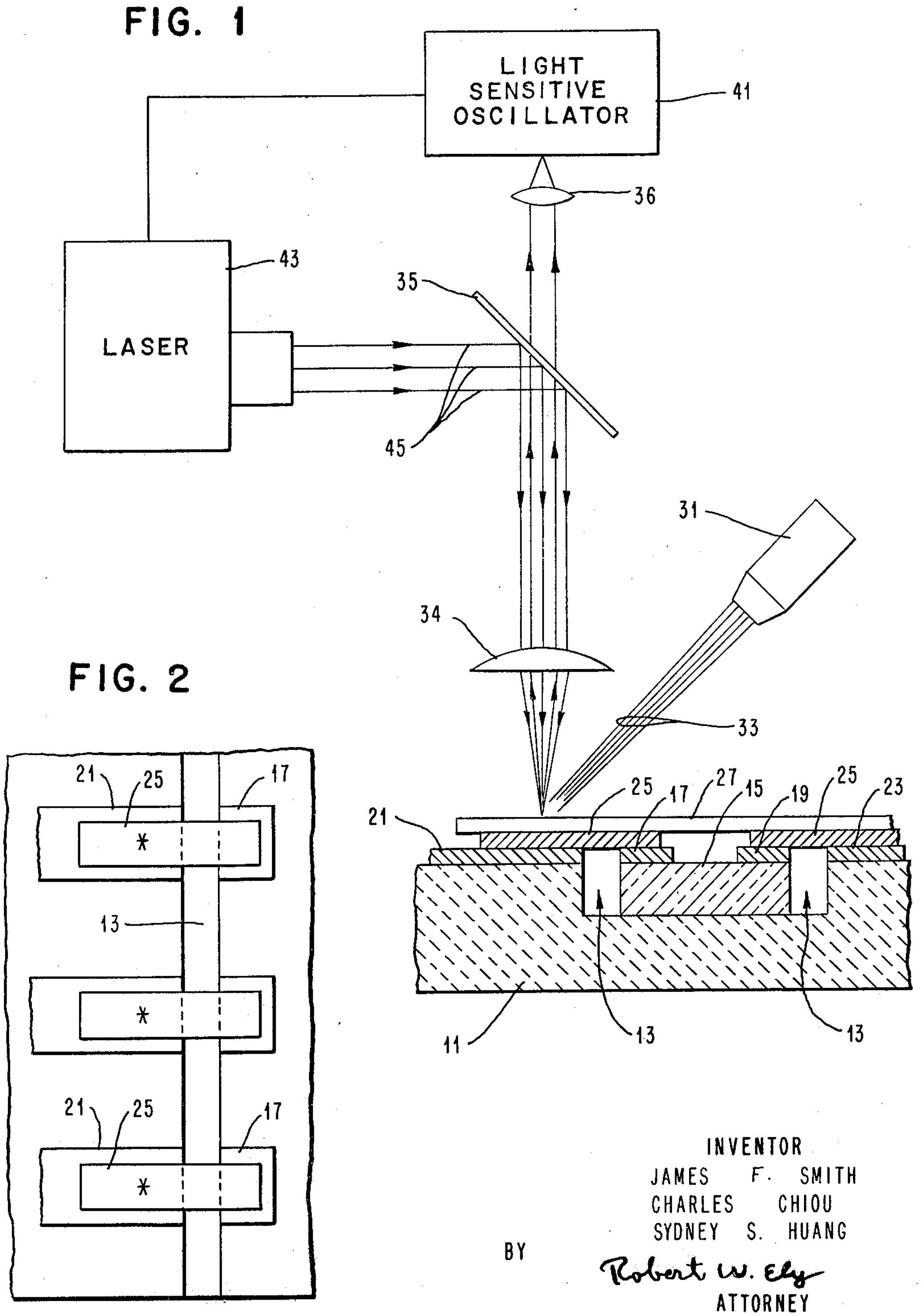

This invention relates to bonding and, more particularly, concerns the bonding in microminiature electronic apparatus.

In the past, many proposals have been devised to bond small parts. Often micromanipulated, resistance-welding apparatus was required which, in any event, introduced some human error. In resistance welding, pressure, current and voltage potential problems existed. It has been proposed to more accurately locate connecting strips between chip lands and substrate lands by using decals. Improved means were needed to make a proper weld at the desired location, especially when the distance between welds is a few mils. Such dimensions are encountered when a small integrated chip is connected to the lands of fanned-out leads of a substrate.

An object of the present invention is to provide improved welding means which overcomes the above-noted disadvantages.

Another object is the provision of means which will weld precisely where desired without manual assistance but by optically recognizing the target.

A further object is an improved welded arrangement which has a selective optic system for triggering a laser.

Another object is the provision of such a welding arrangement wherein a primary focusing lens functions both in the sensing and the laser beam focusing.

A further object is to provide an improved automated system for laser bonding.

In accordance with the broad aspects of the disclosed embodiment of the invention, a chip land is positioned adjacent a substrate land and a decal having a gold connection strip overlaying both lands. The decal strip has a conductive gold line which accurately overlaps for example, one of the substrate lands and one of the chip lands. For welding to the substrate, the assembly is then passed under an optic-laser system so that the strip overlaying the substrate land is positioned at the focal point location and is automatically welded. A high intensity light is directed at the focal point location or target where the gold strip or connector overlays the gold land of the substrate.

Vertically above the target is a focusing lens which will pass collimated light to an inclined dielectric mirror for a ruby laser. This vertically-directed remaining target light passes through the 45° plate to a concentrating lens so that the concentrated beam activates a light sensitive oscillator which is connected to trigger a horizontal ruby laser. The horizontal laser beam impinges on the dielectric mirror and is almost completely reflected downwardly at 90° through the above-mentioned focusing lens to the focal location so that a weld results in milliseconds. Next, the substrate will be automatically moved beneath the optic system and the oscillator will deactivate the laser until the oscillator is automatically operated by the next gold strip reflecting light through the optic-plate-laser system to repeat the process.

The realization of the above objects, along with the features and advantages of the invention, will be apparent from the following description and the accompanying drawing in which:

FIG. 1 is a semi-schematic view of the invention and shows the upwardly-directed trigger light and the 90° deflected laser beam, and FIG. 2 is a broken-away and enlarged top showing of a substrate-chip connection having a side alignment of welds made by automatically passing under the welding arrangement.

Referring to FIG. 1 of the drawing, an alumina or ceramic substrate 11 is formed with a top recess 13. A monolithic integrated circuit on a silicon or germanium chip 15 is mounted in the recess 13 and has, at each top end, a left land 17 and a right land 19. The substrate 11 has a left and right land 21 and 23 terminating at the edge of the recess 13. A connecting strip 25 between the lands is fastened to a carrier transparent film 27. The transparent film has other strips 25 between the substrate lands 21 and chip lands 17 and so forms a decal. The silicon chip 15 has many small components with leads which terminate in lands 17 while the alumina substrate has many small lands for connection to the chip lands. The decal technique is described in IBM Technical Disclosure Bulletin, April 1966, page 1541.

A high intensity light source 31 directs converging light to the focal location where the weld is to be made for joining the substrate lead 21 to the connecting strip 25 which overlay each other at the target. The polyimide film carrier 27 serves to position the connecting strips 25 and does not interfere with the light 31 or other beam since it is transparent. The light beams 33 impinge on the metal connecting strip 25 and are reflected vertically from the focal point or target area to the primary focusing objective lens 34. The plano convex lens 34 collimates or makes parallel the reflected light. This light passes to the dielectric mirror 35 which permits significant passage therethrough of the remaining non-laser light wavelengths.

From mirror 35, the target light passes to a light receiving biconvex focusing lens 36 where it is reconcentrated. This is sensed by a light sensitive oscillator 41. This device is disclosed in detail in the September 1965 IBM Technical Disclosure Bulletin at page 653. This oscillator 41 can distinguish between small differences in light brightness that occurs when light is reflected from two different materials. Thus, in this instance, it is constructed to be activated by the reflection from gold and de-energized by the reflection from the darker alumina. The oscillator could be made responsive to copper or silver and to be de-energized by other ceramics. The oscillator 41 is built to respond only to the reflection from gold and then triggers the electrically connected ruby laser 43. The horizontal laser beams 45 will impinge on the mirror 35 at 45° and will be deflected downwardly ninety degrees to the focusing lens 34. The laser beams are focused or concentrated at the spot or target where the small weld is desired (the focal location or point).

By referring to FIG. 2, it is apparent that the parts to be bonded are moved under the optic system and will be automatically joined by a laser pulse because of the optical sensing. After being deactivated by the insufficient light reflected from darker alumina, the oscillator will then be re-triggered by the light reflected from gold. This enlarged showing corresponds to a plurality of the left connection of FIG. 1. The adhesive decal sheet of polyimide has been removed. The microminiature welding can be appreciated since four mil width lands on eight mil center lines have been made and with more accurate adjustment two mil widths on four mil centers can be done. Of course, the lands and strips are also thin (a mil or less).

The dielectric mirror is made to almost totally reflect a narrow wavelength beam from a ruby, neodymium or similar laser and yet pass vertically the remaining ordinary light. This mirror is also known as a dielectric beam splitter which is built to reflect almost 100% of the laser beam while passing vertically a significant amount of non-laser wavelengths. Since the target light and the laser use the same optic lens elements, it is apparent that the exactly-located welds result automatically. Optical detection and laser beam direction are simultaneously achieved.

While the invention has been particularly shown and described with reference to a preferred embodiment thereof, it will be understood by those skilled in the art that various changes in form and details may be made therein without departing from the spirit and scope of the invention.

What is claimed is:

1. An optical-laser system which automatically senses a target and directs a laser beam to the target comprised of:

a focusing lens adapted to provide a focusing location to be bonded and to direct reflected light from said focusing location into a light path;

a light means arranged to direct light to said focal location;

an inclined dielectric mirror arranged to receive and pass therethrough a major part of said reflected light in said light path;

a light sensitive oscillator located in said light path of said reflected light so as to be actuated by the reflected light passed by said inclined mirror;

a laser electrically connected to said oscillator and arranged to generate a laser beam when said oscillator is actuated;

said inclined dielectric mirror being arranged to have said laser beam reflected therefrom to said focusing lens; and said focusing lens directing said laser beam to said focal location.

2. Means for sequentially bonding pairs of overlayed elements spaced laterally from one another by support structure comprised of:

a focusing lens adapted to provide a focal weld location for successive overlayed pairs of elements to be bonded;

a light means arranged to direct light to said focal location;

an inclined dielectric mirror arranged to receive and pass most of the reflected light rays from said weld location of said elements;

a lens arranged to focus the passed light rays;

a light sensitive oscillator in the path of said focused passed light rays and being constructed to be actuated by the passed light rays;

a laser electrically connected to said oscillator and arranged to generate a laser beam when said oscillator is actuated;

said inclined dielectric mirror being arranged to have said laser beam essentially totally reflected therefrom to said focusing lens; and said focusing lens directing said focused laser beam to said focal location whereby the overlaying elements can be bonded.

3. The means according to claim 2, characterized by said support structure laterally spacing said pairs of overlayed elements having a relatively low reflectivity so that said light sensitive oscillator is turned off between successive overlay pairs of elements thereby turning off said laser beam.

4. The means for laser bonding comprising:

a series of first metallic lands mounted on a substrate;

a series of second metallic lands located on an integrated circuit chip;

light reflective connecting strips overlaying and in contact with said lands to form pairs of elements in bonding location;

a primary objective focusing lens focused on said bonding location to pass light reflected from said bonding location;

a source of high intensity light directed to said bonding location;

an inclined dielectric mirror aligned with said focusing lens;

said mirror being adapted to pass a part of the light from said focusing lens;

a concentrating lens optically aligned with said dielectric mirror;

a light sensitive oscillator aligned with said concentrating lens so that said oscillator receives light reflected from the bonding location, said oscillator being actuated only by a certain reflected light intensity produced by said light reflective connecting strip;

a laser connected to said oscillator and arranged to generate a beam when said oscillator is actuated; and said laser directing said beam to said dielectric mirror where a large percentage of the beam is reflected to said focusing lens and thus to said bonding location for bonding.

5. Apparatus for automatically bonding connecting strips to spaced lands on a support structure having a plurality of aligned lands separated by sections of the support structure and each strip overlaying a land to form a weld target;

an optic system which has a focusing lens having a focal point at the plane of said weld target, a source of high intensity light directed to said weld target, a 45° mirrored plate for passing some reflected light received through said lens from said target area, and a concentrating lens and a light sensitive oscillator aligned with said lens;

said oscillator being actuated by a small intensity variation in reflected light introduced by said strip-land weld target;

said plate being constructed to reflect substantially all of a laser beam impinging on its inclined side;

a laser beam device arranged to be triggered by said oscillator when light is directed to the lens focal point and a weld target is located thereat; and said laser beam device directing its output to the facing inclined plate so that it is reflected toward and concentrated by said focusing lens so that said pairs of overlaid strips and lands are successively bonded as the laser is triggered and deactivated respectively by said strip and said support structure as they reflect light through the plate to the oscillator.

References Cited

UNITED STATES PATENTS

| | | | |
|---|---|---|---|
| 3,267,250 | 8/1966 | Ullery | 219—121 |
| 3,301,949 | 1/1967 | Ullery | 219—121 |
| 3,369,101 | 2/1968 | DiCurcio | 219—121 |
| 3,387,109 | 6/1968 | Bruma et al. | 219—121 |
| ~~3,383,314~~ 3,388,314 | 6/1968 | Gould | 219—121 |

JOSEPH V. TRUHE, Primary Examiner

W. D. BROOKS, Assistant Examiner